United States Patent Office 3,549,646
Patented Dec. 22, 1970

3,549,646
α-PHENYL-α-(4-PIPERIDYL)TOLUIC
ACIDS AND LACTONES
Robert W. Hamilton, Wilmette, and Kurt J. Rorig, Glenview, Ill., assignors to G. D. Searle & Co., Chicago, Ill., a corporation of Delaware
No Drawing. Filed Jan. 13, 1969, Ser. No. 790,885
Int. Cl. C07d 29/24
U.S. Cl. 260—294                 8 Claims

ABSTRACT OF THE DISCLOSURE

Preparation of α-phenyl-α-(4-piperidyl)toluic acids and lactones such as α - phenyl - α - (4-piperidyl)-p-toluic acid hydrochloride, and valuable biological properties thereof including anti-bacterial, anti-fungal, anti-algal, and anti-inflammatory activities, are disclosed.

---

This invention relates to α-phenyl-α-(4-piperidyl)toluic acids and lactones, and to processes for the preparation thereof. More particularly, this invention provides new, useful, and unobvious chemical compounds of the formula

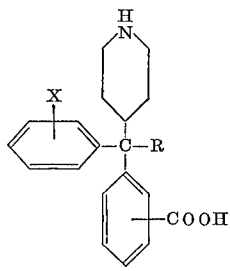

wherein R represents hydrogen or hydroxyl and X represents halogen. Among the halogens, chlorine is preferred; but fluorine, bromine, and iodine are likewise within the purview of the invention.

Those skilled in the art will recognize that when R represents hydroxyl, such of the enformulated compounds as comprise o-carboxyphenyl predominate as lactones of the formula

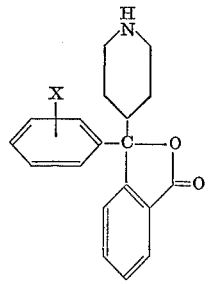

wherein X retains the meaning previously assigned.

Equivalent to the foregoing hydroxy acids and lactones for the purposes of this invention are nontoxic acid addition salts thereof having the formulas

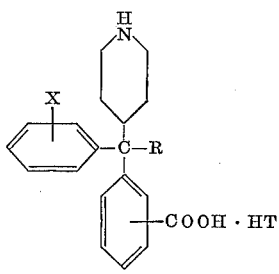

and

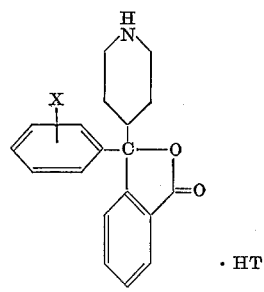

respectively, wherein T represents 1 equivalent of an anion—for example, chloride, bromide, iodide, nitrate, phosphate, sufate, sulfamate, methyl sulfate, ethyl sulfate, benzenesulfonate, toluenesulfonate, acetate, lactate, glycolate, succinate, malate, maleate, tartrate, citrate, gluconate, ascorbate, benzoate, cinnamate, or the like—which, in combination with the cationic portion of a salt aforesaid, is neither biologically nor otherwise incompatible.

Likewise equivalent to the hydroxy acids and lactones of this invention are the alkali, alkaline earth, and ammonium salts of the acids.

Still further equivalence exists as between any of the foregoing compounds and a solvate thereof in which biologically insignificant solvent is present.

The compounds to which this invention relates are useful by reason of their valuable biological properties. Thus for example, they are anti-bacterial, anti-fungal, anti-algal, and anti-inflammatory.

The anti-bacterial, anti-fungal, and anti-algal utility of the instant compounds is evident from the results of standardized tests whereby sterile blood (in the anti-bacterial test), Mycophil (in the anti-fungal tests), and Bristol agar plates are inoculated with *Diplococcus pneumoniae*, *Trichophyton mentagrophytes*, *Candida albicans*, and *Chlorella vulgaris*, respectively; approximately 5 mg. of compound is placed on the surface of each plate so as to cover a circle approximately 4 mm. in diameter; and the plates are incubated in accordance with the following schedule:

| Organism | Time | Temp. | Artificial light |
|---|---|---|---|
| D. pneumoniae | 24 hr | 36° | No. |
| T. mentagrophytes | 96 hr | 25° | No. |
| C. albicans | 96 hr | 25° | No. |
| C. vulgaris | 5-7 days | 25° | Yes. |

Undecylenic acid and nystatin serve as reference standards in the anti-fungal tests; copper sulfate is the reference standard in the anti-algal test. Clear zones of inhibition signify the utility in question.

The anti-inflammatory utility of the instant compounds is evident from the results of a standardized test for their capacity to inhibit the formation of granuloma tissue induced in adrenalectomized rats by implanted cotton. The procedure is a modification of one described by Dulin in Proc. Soc. Exp. Biol. Med., 90, 115 (1955). Male sprague-Dawley rats weighing 180–220 gm. are adrenalectomized, and their drinking water is thereafter replaced by aqueous 0.86% sodium chloride supplemented during the first 24 hours by glucose q.s. 5%. On the day after the adrenalectomy, 4 pellets of dental cotton weighing 5–7 mg. apiece are separately, subcutaneously, and bilaterally implanted in the pectoral and dorsal lateral neck region of each animal whereupon the prescribed dose (initially, 20 mg. intragastrically) of compound to be tested, dissolved or suspended in a vehicle consisting of 0.5 ml. of either corn oil or a mixture of 20 ml. of aqueous 0.86% saline with 1 drop of polysorbate 80, is administered intragastrically or subcutaneously to each of 3–6 animals. A like group of animals to which is identically and concurrently administered vehicle alone serves as controls. This treatment is repeated the next day. The day after that the animals are sacrificed; and the pellets, with associated granuloma tissue, are dissected, dried, and weighed. A compound is considered anti-inflammatory if the mean weight of granuloma tissue in the group of animals treated therewith, adjusted to compensate for variations in dissection technique, is significantly ($P \leq 0.05$) less than the corresponding weight in the control group. A total (2×0.25 mg.) dose of 0.5 mg. of hydrocortisone, administered subcutaneously, prevents the growth of granuloma tissue in this test.

Further evidence of the anti-inflammatory utility of the instant compounds is provided by the results of a standardized test for their capacity to inhibit the edema induced in rats by injection of carrageenin. The procedure is a modification of one described by Winter et al., Proc. Soc. Exp. Biol. Med., 111, 544 (1962). Compound is administered subcutaneously or intragastrically, dissolved or suspended in 0.5 ml. of aqueous 0.86% sodium chloride, propylene glycol, a mixture of these vehicles, or corn oil, to each of 10 male rats weighing 100–130 gm. A like group of rats to which is identically and concurrently administered vehicle alone serves as controls. Precisely 1 hour later, each animal is injected under the plantar surface of each hind foot with 0.1 ml. of an aqueous 1% solution of carrageenin (Marine Colloids, Inc., Type 402). A compound is considered anti-inflammatory if the average total circumference (T) of the two hind feet in the group treated therewith, which is measured in arbitrary units 5 hr. after the carrageenin injection, is significantly ($P \leq 0.05$) less than the corresponding value (C) for the control group.

Those skilled in the art will recognize that observations of activity in standardized tests for particular biological effects are fundamental to the development of valuable new drugs, both veterinary and human. Distinct from such applications, anti-algal compounds are adapted to the conditioning of boiler feedwater.

Preparation of the subject compounds proceeds by low pressure hydrogenation of the corresponding pyridyl compound

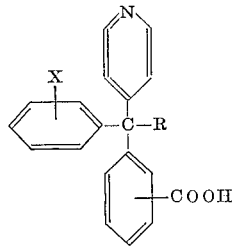

in ethanol, using platinic oxide as catalyst. Conversion of the resultant amines to acid addition salts is accomplished by admixture in each instance with 1 equivalent of any of various inorganic and strong organic acids, the anionic portion of which conforms to T as hereinabove defined. Both the hydroxy acids and the lactones of this invention afford alkali, alkaline earth and ammonium salts upon contact with appropriate aqueous bases—for example, KOH, NaOH, Ca(OH)$_2$, NH$_4$OH, etc. These salts, in turn, are converted to hydroxy acids via brief exposure to a proton source. Prolongation of exposure time induces lactonization where hydroxyl and appropriately situate carboxy are present as aforesaid.

The pyridyl intermediates eventuate by contacting an iodobenzoic acid

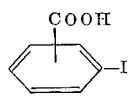

with a 4-benzoylpyridine of the formula

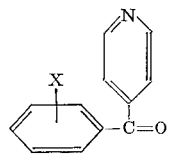

and butylithium at —70° C. in anhydrous ether to give the corresponding α-hydroxy-α-phenyl-α-(4-pyridyl)-p-toluic acid

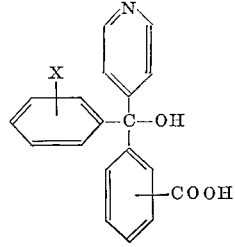

wherein the hydroxyl is reduced to hydrogen on heating with hydriodic and hydrochloric acids in acetic acid.

Through the foregoing formulas, the definition of R and X remains as originally set forth.

The following examples describe in detail compounds illustrative of the present invention and methods which have been devised for their preparation. However, the invention is not to be construed as limited thereby, either in spirit or in scope, since it will be apparent to those skilled in the art of organic syntheses that many modifications, both of materials and of methods, may be practiced without departing from the purpose and intent of this disclosure. Throughout the examples hereinbefore set forth, temperatures are given in degrees centigrade, pressures in atmospheres, and relative amounts of materials in parts by weight, except as otherwise noted.

EXAMPLE 1

(A) α-Hydroxy-α-phenyl-α-(4-pyridyl)-p-toluic acid

To a suspension of 50 parts of p-iodobenzoic acid in 400 parts of anhydrous ether at —70° is added, with stirring during 45 minutes, a solution of 26 parts of butylithium in 200 parts of anhydrous ether. Stirring at —70° is continued for 1 hour, whereupon 37 parts of 4-benzoylpyridine is mixed in during 5 minutes and stirring at —70° then resumed for 1 hour longer. The resultant mixture is allowed to warm to room temperature during 3 hours, at which point sufficient water to dissolve all solids is mixed in and the aqueous layer separated, washed with water, and acidified with 120 parts of concentrated hydrochloric acid. The excess p-iodobenzoic acid thereby precipitated is filtered out, and the filtrate is washed with ether and adjusted to pH 7 with ammonium hydroxide. The resultant precipitate is α-hydroxy-α-phenyl-α-(4-pyridyl)-p-toluic acid which, isolated by filtration and dried in air, sinters at 245° and melts at 255–260°.

(B) α-Phenyl-α-(4-pyridyl)-p-toluic acid

A mixture of 19 parts of α-hydroxy-α-phenyl-α-(4-pyridyl)-p-toluic acid, 70 parts of 47% hydriodic acid, 12 parts of concentrated hydrochloric acid, and 40 parts of glacial acetic acid is heated at the boiling point under reflux for 5 minutes, then poured into a mixture of 16 parts of sodium bisulfite, 80 parts of water, and 50 parts of ice and stirred vigorously while being neutralized with aqueous concentrated sodium hydroxide. The resultant mixture is extracted with ether. The ether extract is washed with water, dried over calcium sulfate, and stripped of solvent by distillation. The residual oil is α-phenyl-α-(4-pyridyl)-p-toluic acid.

(C) α-Phenyl-α-(4-piperidyl)-p-toluic acid hydrochloride

A solution of 150 parts of α-phenyl-α-(4-pyridyl)-p-toluic acid in 2000 parts of 95% ethanol and 50 parts of concentrated hydrochloric acid is agitated under 3 atmospheres of hydrogen in the presence of 6 parts of platinic oxide at room temperatures until the theoretical amount of hydrogen is taken up. Catalyst is thereupon filtered out and solvent removed from the filtrate by vacuum distillation. The residue is recrystallized from a mixture of butanone and anhydrous ethanol to give α-phenyl-α-(4-piperidyl)-p-toluic acid hydrochloride melting in the range 290–297° with gas evolution. It has the formula

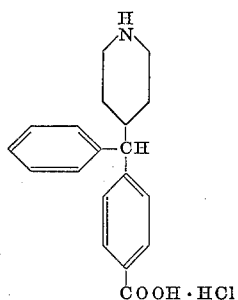

EXAMPLE 2

α-Hydroxy-α-phenyl-α-(4-piperidyl)-p-toluic acid hydrochloride

A solution of 150 parts of α-hydroxy-α-phenyl-α-(4-pyridyl)-p-toluic acid in 2000 parts of 95% ethanol and 50 parts of concentrated hydrochloric acid is agitated under 3 atmospheres of hydrogen in the presence of 6 parts of platinic oxide at room temperatures until the theoretical amount of hydrogen is taken up. Catalyst is thereupon filtered out and solvent removed from the filtrate by vacuum distillation. The residue is α-hydroxy-α-phenyl-α-(4-piperidyl)-p-toluic acid hydrochloride having the formula

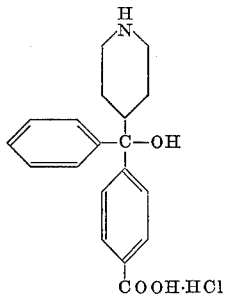

EXAMPLE 3

(A) α-(o-Chlorophenyl)-α-hydroxy-α-(4-pyridyl)-p-toluic acid

Substitution of 44 parts of 4-(o-chlorobenzoyl)pyridine for the 4-benzoylpyridine called for in Example 1(A) affords, by the procedure there detailed, α-(o-chlorophenyl)-α-hydroxy-α-(4-pyridyl)-p-toluic acid.

(B) α-(o-Chlorophenyl)-α-(4-pyridyl)-p-toluic acid

Substitution of 21 parts of α-(o-chlorophenyl-α-hydroxy-α-(4-pyridyl)-p-toluic acid for the α-hydroxy-α-phenyl-α-(4-pyridyl)-p-toluic acid called for in Example 1(B) affords, by the procedure there detailed, α-(o-chlorophenyl)-α-(4-pyridyl)-p-toluic acid.

(C) α-(o-Chlorophenyl)-α-(4-piperidyl)-p-toluic acid hydrochloride

Substitution of 150 parts of α-(o-chlorophenyl)-α-(4-pyridyl)-p-toluic acid for the α-hydroxy-α-phenyl-α-(4-pyridyl)-p-toluic acid called for in Example 2 affords, by the procedure there detailed, α-(o-chlorophenyl)-α-(4-piperidyl)-p-toluic acid hydrochloride, having the formula

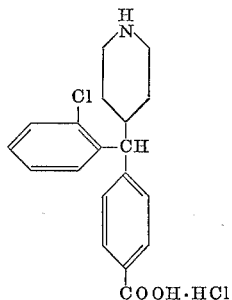

EXAMPLE 4

(A) α-(p-Chlorophenyl)-α-hydroxy-α-(4-pyridyl)-m-toluic acid

Substitution of 50 parts of m-iodobenzoic acid and 44 parts of 4-(p-chlorobenzoyl)pyridine for the p-iodobenzoic acid and 4-benzoylpyridine, respectively, called for in Example 1(A) affords, by the procedure there detailed, α-(p-chlorophenyl)-α-hydroxy-α-(4-pyridyl)-m-toluic acid sintering at 148° and melting at 151–157° with gas evolution.

(B) α-(p-Chlorophenyl)-α-(4-pyridyl)-m-toluic acid

Substitution of 19 parts of α(p-chlorophenyl)-α-hydroxy-α-(4-pyridyl)-m-toluic acid for the α-hydroxy-α-phenyl-α-(4-pyridyl)-p-toluic acid called for in Example 1(B) affords, by the procedure there detailed, α-(p-chlorophenyl)-α-(4-pyridyl)-m-toluic acid sintering at 216° and melting in the range 223–231°.

(C) α-(p-Chlorophenyl)-α-(4-piperidyl)-m-toluic acid hydrochloride monohydrate

A solution of 150 parts of α-(p-chlorophenyl)-α-(4-pyridyl)-m-toluic acid in 2000 parts of 95% ethanol and 50 parts of concentrated hydrochloric acid is agitated under 3 atmospheres of hydrogen in the presence of 6 parts of platinic oxide at room temperatures until the theoretical amount of hydrogen is taken up. Catalyst is thereupon filtered out and solvent removed from the filtrate by vacuum distillation. The residue is crystallized from a mixture of absolute ethanol and anhydrous ether to give, α-(p-chlorophenyl)-α-(4-piperidyl)-m-toluic acid hydrochloride which, on exposure to air, picks up 1 molar equivalent of water of crystallization. The hydrate thus obtained melts at approximately 185° with gas evolution. The anhydrous product has the formula

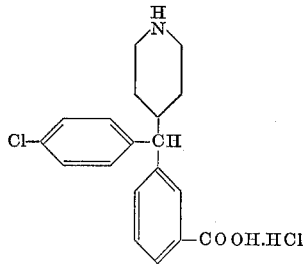

EXAMPLE 5

(A) α-Hydroxy-α-phenyl-α-(4-pyridyl)-o-toluic acid γ-lactone

Substitution of 50 parts of o-iodobenzoic acid for the p-iodobenzoic acid called for in Example 1(A) affords, by the procedure there detailed, α-hydroxy-α-phenyl-α-(4-pyridyl)-o-toluic acid γ-lactone sintering at approximately 100° and melting in the range 110–118°.

(B) α-Phenyl-α-(4-pyridyl)-o-toluic acid

A mixture of 19 parts of α-hydroxy-α-phenyl-α-(4-pyridyl)-o-toluic acid γ-lactone, 70 parts of 47% hydriodic acid, 12 parts of concentrated hydrochloric acid, and 40 parts of glacial acetic acid is heated at the boiling point under reflux for 12 hours, then poured into a mixture of 16 parts of sodium bisulfite, 80 parts of water, and 50 parts of ice. The resultant mixture is stirred vigorously while being neutralized with aqueous concentrated sodium hydroxide. The mixture thus obtained is extracted with ether. The ether extract is washed with water, dried over calcium sulfate and stripped of solvent by vacuum distillation. The residue is α-phenyl-α-(4-pyridyl)-o-toluic acid melting at 160–164°.

(C) α-Phenyl-α-(4-piperidyl)-o-toluic acid hydrochloride

Substitution of 150 parts of α-phenyl-α-(4-pyridyl)-o-toluic acid for the α-hydroxy-α-phenyl-α-(4-pyridyl)-p-toluic acid called for in Example 2 affords, by the procedure there detailed, α-phenyl-α-(4-piperidyl)-o-toluic acid hydrochloride, having the formula

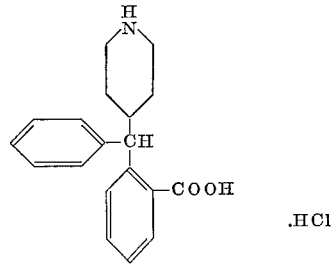

EXAMPLE 6

α-Hydroxy-α-phenyl-α-(4-piperidyl)-o-toluic acid γ-lactone hydrochloride

Substitution of 150 parts of α-hydroxy-α-phenyl-α-(4-pyridyl)-o-toluic acid γ-lactone for the α-phenyl-α-(4-pyridyl)-p-toluic acid called for in Example 1(C) affords, by the procedure there detailed, α-hydroxy-α-phenyl-α-(4-piperidyl)-o-toluic acid γ-lactone hydrochloride sintering at 298° and melting at 302–304°. The product has the formula

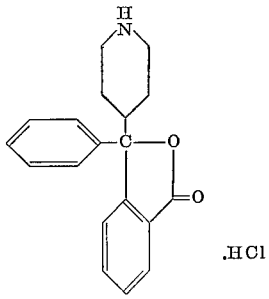

EXAMPLE 7

(A) α-(p-Chlorophenyl)-α-hydroxy-α-(4-pyridyl)-o-toluic acid γ-lactone

Substitution of 44 parts of 4-(p-chlorobenzoyl)pyridine and 50 parts of o-iodobenzoic acid for the 4-benzoylpyridine and p-iodobenzoic acid, respectively, called for in Example 1(A) affords, by the procedure there detailed, α-(p-chlorophenyl)-α-hydroxy-α-(4-pyridyl)-o-toluic acid γ-lactone sintering at 163° and melting at 168–171°.

(B) α-(p-Chlorophenyl)-α-(4-pyridyl)-o-toluic acid

A mixture of 19 parts of α-(p-chlorophenyl)-α-hydroxy-α-(4-pyridyl)-o-toluic acid γ-lactone, 70 parts of 47% hydriodic acid, 12 parts of concentrated hydrochloric acid, and 40 parts of glacial acetic acid is heated at the boiling point under reflux for 20 hours, then poured into a mixture of 16 parts of sodium bisulfite, 80 parts of water, and 50 parts of ice. The resultant mixture is stirred vigorously while excess aqueous 5% sodium hydroxide is introduced. Insoluble solids are filtered off and the filtrate adjusted to pH 7 with aqueous 5% acetic acid. The solid thrown down is filtered off and recrystallized from butanone to give α-(p-chlorophenyl)-α-(4-pyridyl)-o-toluic acid sintering at 200° and melting at 205–208°.

(C) α-(p-chlorophenyl)-α-(4-piperidyl)-o-toluic acid hydrochloride

Substitution of 150 parts of α - (p - chlorophenyl)-α - (4 - pyridyl - o - toluic acid for the α - (p - chlorophenyl) - α - (4 - pyridyl) - m - toluic acid called for in Example 4(C) affords, by the procedure there detailed, α - (p - chlorophenyl) - α - (4 - piperidyl)-o-toluic acid hydrochloride melting in the range 300–325° with gas evolution. The product has the formula

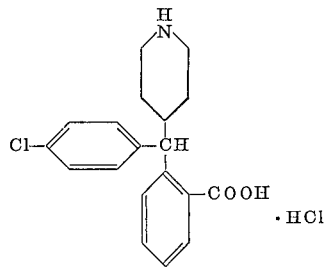

EXAMPLE 8

α-(p-chlorophenyl)-α-hydroxy-α-(4-piperidyl)-o-toluic acid γ-lactone

A solution of 150 parts of α - (p - chlorophenyl)-α - hydroxy - α - (4 - pyridyl) - o - toluic acid γ-lactone in 2000 parts of 95% ethanol and 50 parts of concentrated hydrochloric acid is agitated under 3 atmospheres of hydrogen in the presence of 6 parts of platinic oxide at room temperatures until the theoretical amount of hydrogen is taken up. Catalyst is thereupon filtered out and solvent removed from the filtrate by vacuum distillation. The residue is taken up in water, and the resultant aqueous solution is washed well with ether and thereupon adjusted to pH 7 with aqueous 5% sodium hydroxide. The solid precipitate thrown down is filtered off and recrystallized from butanone to give α-(p-chlorophenyl) - α - hydroxy - α - (4 - piperidyl) - o- toluic acid γ-lactone sintering at 170° and melting at 192–194°. The product has the formula

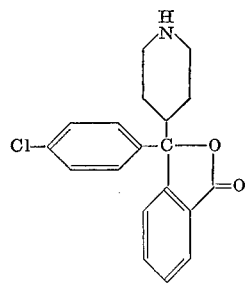

EXAMPLE 9

(A) α-(o-chlorophenyl)-α-hydroxy-α-(4-pyridyl)-o-toluic acid

Substitution of 50 parts of o-iodobenzoic acid and 44 parts of 4-(o-chlorobenzoyl)pyridine for the p-iodobenzoic acid and 4-benzoylpyridine, respectively, called for in Example 1(A) affords, by the procedure there detailed, α - (o - chlorophenyl) - α - hydroxy - α - (4 - pyridyl) o-toluic acid.

(B) α-(o-chlorophenyl)-α-hydroxy-α-(4-piperidyl)-o-toluic acid γ-lactone hydrochloride Substitution of 150 parts of α - (o - chlorophenyl)-α-hydroxy - α - (4 - pyridyl) - o - toluic acid for the α-hydroxy - α - phenyl - α - (4 - pyridyl) - p - toluic acid called for in Example 2 affords, by the procedure there detailed α - (o - chlorophenyl) - α - hydroxy - α - (4- piperidyl) - o - toluic acid γ-lactone hydrochloride, having the formula

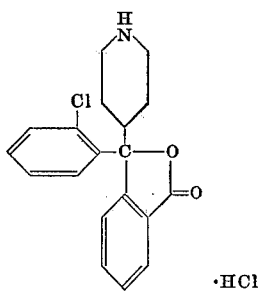

·HCl

What is claimed is:
1. A compound selected from the group consisting of compounds of the formula

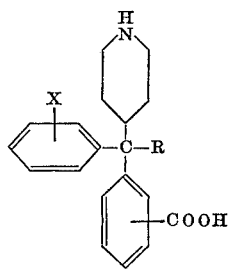

and compounds of the formula

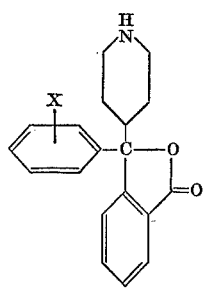

wherein X represents hydrogen or chlorine and R represents hydrogen or hydroxyl.

2. A compound according to claim 1 having the formula

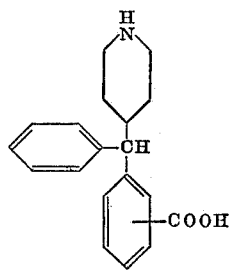

3. A compound according to claim 1 which is α-phenyl-α-(4-piperidyl)-p-toluic acid.

4. A compound according to claim 1 having the formula

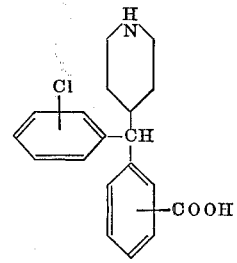

5. A compound according to claim 1 which is α-(p-chlorophenyl)-α-(4-piperidyl)-m-toluic acid.

6. A compound according to claim 1 which is α-hydroxy - α - phenyl - α - (4 - piperidyl) - o- toluic acid γ-lactone.

7. A compound according to claim 1 having the formula

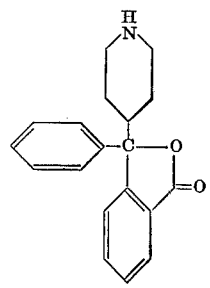

8. A compound according to claim 1 which is α-(p-chlorophenyl) - α - hydroxy - α - (4 - piperidyl )- o- toluic acid γ-lactone.

References Cited
Ravenna, Farmaco Ed. Sci. 14, 473–82 (1959).

HENRY R. JILES, Primary Examiner

G. T. TODD, Assistant Examiner

U.S. Cl. X.R.
260—240, 293.4, 294.3, 295; 424—267